(12) United States Patent
Zucchelli et al.

(10) Patent No.: US 7,629,404 B2
(45) Date of Patent: Dec. 8, 2009

(54) THERMOPLASTIC POLYOLEFIN COMPOSITION

(75) Inventors: Ugo Zucchelli, Ferrara (IT); Monica Vianello, S. Maria Maddalena (IT)

(73) Assignee: Basell Polioefine Italia s.r.l., Milan (IT)

( * ) Notice: Subject to any disclaimer, the term of this patent is extended or adjusted under 35 U.S.C. 154(b) by 0 days.

(21) Appl. No.: 11/661,533

(22) PCT Filed: Jul. 18, 2005

(86) PCT No.: PCT/EP2005/053451

§ 371 (c)(1),
(2), (4) Date: Feb. 8, 2008

(87) PCT Pub. No.: WO2006/024579

PCT Pub. Date: Mar. 9, 2006

(65) Prior Publication Data

US 2008/0306198 A1    Dec. 11, 2008

Related U.S. Application Data

(60) Provisional application No. 60/606,783, filed on Sep. 2, 2004.

(30) Foreign Application Priority Data

Aug. 31, 2004   (EP) .................................. 04104162

(51) Int. Cl.
*A63B 37/00* (2006.01)
*C08K 5/04* (2006.01)

(52) U.S. Cl. ...................................... 524/432; 524/394

(58) Field of Classification Search .................. 524/432
See application file for complete search history.

(56) References Cited

U.S. PATENT DOCUMENTS

| 4,350,797 | A | | 9/1982 | Marzola et al. |
| 4,482,672 | A | * | 11/1984 | Neuray et al. .................. 525/67 |
| 6,162,872 | A | * | 12/2000 | Berta .......................... 525/240 |
| 6,207,761 | B1 | | 3/2001 | Smith et al. |
| 2004/0198919 | A1 | * | 10/2004 | Pelliconi et al. .......... 525/333.7 |
| 2005/0119380 | A1 | | 6/2005 | Iwashita |

FOREIGN PATENT DOCUMENTS

| EP | 157106 | | 10/1985 |
| EP | 472946 | | 3/1992 |
| EP | 572028 | | 12/1993 |
| EP | 844279 | | 5/1998 |
| EP | 922729 | | 6/1999 |
| EP | 922729 | A1 * | 6/1999 |
| JP | 06287223 | | 10/1994 |
| WO | 00/02929 | | 1/2000 |
| WO | 03/011962 | | 2/2003 |

* cited by examiner

*Primary Examiner*—Ling-Siu Choi
*Assistant Examiner*—Hui Chin
(74) *Attorney, Agent, or Firm*—Jarrod N. Raphael

(57) ABSTRACT

A thermoplastic polyolefin composition comprising:
(1) 30-70 wt. % of an heterophasic propylene polymer;
(2) 20-60 wt. % of a copolymer of ethylene with a comonomer selected from the group consisting of $C_{3-6}$ α,β-unsaturated carboxylic acids, $C_{1-8}$ alkyl esters of a $C_{3-6}$ α,β-unsaturated carboxylic acid and mixtures thereof; and
(3) 2-20 wt. % of a metal compound selected from the group consisting of: acetates, stearates, hydroxides and oxides of zinc, magnesium, calcium, sodium and mixture thereof.

14 Claims, No Drawings

THERMOPLASTIC POLYOLEFIN COMPOSITION

This invention relates to thermoplastic polymer compositions, to the process for their preparation, and to thermoformed articles made therefrom.

Thermoplastic polyolefin materials (TPOs) are melt or reactor blends of polyolefin materials and uncrosslinked elastomers. Due to their thermoformability, soft feel, heat and UV resistance, TPOs are finding use in automotive field, especially in interior trim, such as dashboards, door panels and instrument panel skins.

The process for producing interior trims normally involves at least a first step of extruding or calendering the TPO sheet or film and a second step of embossing the extruded or calendered sheet to produce a "grained" surface. Subsequently, the embossed sheets or films are shaped to obtain the final article, normally by thermoforming or by low-pressure injection molding. In thermoforming, the embossed sheet is heated till it becomes soft and pliable; when sufficient softness has occurred vacuum or pressure are applied and the sheet is forced into the mold (negative thermoforming) or the mold is forced into the sheet before the vacuum or pressure is applied (positive thermoforming).

The major drawback of TPO sheets is their poor ability of retaining the embossed grain after positive thermoforming.

Polyolefin compositions used for making embossed sheets with improved grain retention are described in EP 844 279. Such polyolefin compositions contain a propylene polymer material and a partially crosslinked thermoplastic olefin elastomer (TPE). The TPE is prepared by adding a peroxide curing system comprising an organic peroxide and a crosslinking agent to the elastomer and subjecting the mixture to curing conditions.

According to U.S. Pat. No. 6,162,872 embossed sheets having improved grain retention can be made from a polyolefin composition containing a propylene polymer material, a partially crosslinked thermoplastic polyolefin elastomer (TPE) and crystalline polyethylene. The polyolefin compositions described in the above-mentioned patent are endowed with fluidity problems due to the presence of unreacted peroxides.

In the U.S. Pat. No. 6,207,761 ionomer/rubber/polyolefin melt blends are described, which exhibit no noticeable loss in grain retention after thermoforming at a visual inspection but have poor scratch resistance. Such blends comprise a thermoplastic ionomer, a crosslinked or an acrylonitrile rubber and a thermoplastic polymer.

JP 6-287223 describes a manufacturing method of ionomer compositions in which ethylene/unsaturated carboxylic acid copolymer, olefin polymer and metallic compound are supplied to a screw extruder. The reaction is carried out by kneading at temperature at which each polymer melts. The olefin polymer may be HDPE, LDPE, LLDPE, polypropylene, poly-1-butene, poly-4-methyl-1-pentene, 1,2-polybutadiene, ethylene/vinyl acetate copolymer, ethylene/acrylate copolymer, ethylene/methacrylic acid ester copolymer. The document is silent about the physical properties of the polyolefin blends thus obtained.

There is however still the need of thermoformable polymer compositions showing high grain retention of the embossed pattern, particularly when shaped by positive thermoforming, having improved scratch resistance and showing contemporarily good impact strength and stiffness.

The present invention provides a thermoplastic polyolefin composition comprising:
(1) 30-70 wt. %, preferably 35-60 wt. %, more preferably 40-50 wt. %, of an heterophasic propylene polymer;
(2) 20-60 wt. %, preferably 30-45 wt. %, more preferably 35-45 wt. %, of a copolymer of ethylene with a comonomer selected from the group consisting of $C_{3-6}$ α,β-unsaturated carboxylic acids, $C_{1-8}$ alkyl esters of a $C_{3-6}$ α,β-unsaturated carboxylic acid and mixtures thereof; and
(3) 2-20 wt. %, preferably 4-12 wt. %, more preferably 7-12 wt. %, of a metal compound selected from the group consisting of: acetates, stearates, hydroxides and oxides of zinc, magnesium, calcium, sodium and mixture thereof.

In a first embodiment, the heterophasic propylene polymer (1) may be a polyolefin composition comprising:
(A) 8-25 wt. %, of a crystalline polymer fraction selected from the group consisting of:
　(i) a propylene homopolymer and
　(ii) a copolymer of propylene and at least one alpha-olefin of formula $CH_2=CHR^o$, where $R^o$ is H or a $C_{2-8}$ linear or branched alkyl, said copolymer containing at least 85 wt. % of propylene units; and
(B) 75-92 wt. %, of an elastomeric fraction comprising:
　(a) a first elastomeric copolymer of propylene with at least one alpha-olefin of formula $CH_2=CHR^1$, where $R^1$ is H or a $C_{2-8}$ linear or branched alkyl, optionally containing 0.5-5 wt. % of a diene, said first elastomeric copolymer containing 15-32 wt. % alpha-olefin; and
　(b) a second elastomeric copolymer of propylene with at least one alpha-olefin of formula $CH_2=CHR^2$, where $R^2$ is H or a $C_{2-8}$ linear or branched alkyl, optionally containing 0.5-5 wt. % of a diene, said second elastomeric copolymer containing 32-45 wt. %, and having solubility in xylene at room temperature greater than 80 wt. %;
　the (a)/(b) ratio ranging from 1:5 to 5:1.

By "crystalline polymer" is meant herein a polymer having a solubility in xylene at room temperature lower than 20 wt. %. By "room temperature" is meant a temperature of about 25° C. The solubility in xylene is determined according to the following method: 2.5 g of polymer are dissolved in 250 mL of o-xylene under stirring at 135° C. for 30 minutes, then the solution is cooled to 25° C. and after 30 minutes the insoluble polymer is filtered. The resulting solution is evaporated in nitrogen flow and the residue is dried and weighed to determine the percentage of soluble polymer.

The crystalline polymer (A)(i) is a propylene homopolymer having solubility in xylene at room temperature lower than 20 wt. %, preferably lower than 10 wt. % and even more preferably lower than 5 wt. %. The crystalline polymer (A)(ii) is a copolymer of propylene with at least one alpha-olefin of formula $CH_2=CHR^o$, where $R^o$ is H or a $C_{2-8}$ linear or branched alkyl, containing at least 85 wt. %, preferably at least 90 wt. %, of propylene units and it has a solubility in xylene at room temperature lower than 20 wt. %, preferably lower than 15 wt. %, even more preferably lower than 8 wt. %. Said alpha-olefin is preferably ethylene, butene-1, pentene-1,4-methylpentene, hexene-1, octene-1 or combinations thereof, and even more preferably the crystalline polymer of propylene A(ii) is a copolymer of propylene and ethylene.

The elastomeric fraction (B) comprises a first elastomeric copolymer (a) and a second elastomeric copolymer (b). By "elastomeric" is meant herein a polymer having a solubility in xylene at room temperature greater than 50% by weight. The first elastomeric copolymer (a) is a copolymer of propylene with at least one alpha-olefin of formula $CH_2=CHR^1$, where $R^1$ is H or a $C_{2-8}$ linear or branched alkyl, optionally containing 0.5 to 5 wt. % of a diene. Said alpha-olefin is preferably ethylene, butene-1, hexene-1 or octene-1, and even more preferably is ethylene. The alpha-olefin content ranges from 15 to 32 wt. %, preferably from 25 to 30 wt. %. The elastomeric copolymer (a) has a solubility in xylene at room temperature greater than 50 wt. %, preferably greater than 70 wt. %, and even more preferably greater than 80%; the intrinsic viscosity of the xylene soluble fraction preferably ranges from 3.0 to 5.0 dl/g, more preferably from 3.5 to 4.5 dl/g, and even more preferably from 3.8 to 4.3 dl/g. The second elastomeric copolymer fraction (b) is a copolymer of propylene with at least one alpha-olefin of formula $CH_2=CHR^2$, where $R^2$ is H or a $C_{2-8}$ linear or branched alkyl, optionally containing 0.5 to 5 wt. % of a diene; said alpha-olefin is preferably ethylene, butene-1, hexene-1 or octene-1, and even more preferably is ethylene. The alpha-olefin content is greater than 32 wt. % up to 45 wt. %, and preferably ranges from 35 to 40 wt. %. The elastomeric copolymer (b) has solubility in xylene at room temperature greater than 80 wt. %, preferably greater than 85 wt. %, and the intrinsic viscosity of the xylene soluble fraction preferably ranges from 4.0 to 6.5 dl/g, preferably from 4.5 to 6.0, and more preferably from 5.0 to 5.7 dl/g.

The intrinsic viscosity is determined in tetrahydronaphtalene at 135° C.

The diene optionally present in fractions (a) and (b) of component (B) is a conjugated or non-conjugated diene, such as butadiene, 1,4-hexadiene, 1,5-hexadiene and ethylidenenorbornene-1. The diene, if present, is contained in an amount of from 0.5 to 5% by weight, with respect to the weight of the fraction (B).

More preferably, the heterophasic propylene polymer (1) comprises from 10 to 20 wt. %, particularly preferably from 12 to 18 wt. %, of component (A) and from 80 to 90 wt. %, particularly preferably from 82 to 88 wt. %, of component (B).

In a second embodiment, the heterophasic propylene polymer (1) is a polyolefin composition comprising:
(A) 10-50 wt. %, of a crystalline polymer fraction selected from the group consisting of:
  (i) a propylene homopolymer and
  (ii) a copolymer of propylene and at least one alpha-olefin of formula $CH_2=CHR^3$, where $R^3$ is H or a $C_{2-8}$ linear or branched alkyl, said copolymer containing at least 85 wt. % of propylene units; and
(B) 50-90 wt. %, of an ethylene copolymer comprising:
  (iii) 0-20 wt. % of a crystalline fraction of a copolymer of ethylene with at least one alpha-olefin of formula $CH_2=CHR^4$ where $R^4$ is a $C_{1-8}$ alkyl radical, optionally containing a minor amount of a diene; and
  (iv) 80-100 wt. % of an elastomeric fraction of a copolymer of ethylene with at least one alpha-olefin of formula $CH_2=CHR^5$ where $R^5$ is a $C_{1-8}$ alkyl radical, optionally containing a minor amount of a diene, and containing less than 40 wt. % of ethylene units.

The crystalline polymer fraction (A) of the second preferred embodiment is the same as described in the foregoing.

The crystalline fraction B(iii) of the heterophasic propylene polymer, if present, is a copolymer of ethylene with at least one alpha-olefin of formula $CH_2=CHR^4$ where $R^4$ is a $C_{1-8}$ linear or branched alkyl radical, said alpha-olefin being preferably propylene, butene-1, hexene-1 or octene-1, even more preferably being propylene. The crystalline fraction B(iii) has a solubility in xylene lower than 20 wt % and preferably it is insoluble in xylene at room temperature.

The elastomeric fraction B(iv) is a copolymer of ethylene with at least one alpha-olefin of formula $CH_2=CHR^5$ where $R^5$ is a $C_{1-8}$ linear or branched alkyl radical, preferably said alpha-olefin is propylene, butene-1, hexene-1 or octene-1, even more preferably is propylene. The elastomeric fraction B(iv) contains less than 40 wt % of ethylene, preferably 20-38 wt %, more preferably 25-38 wt % and it has solubility in xylene greater than 50 wt %, preferably it is completely soluble in xylene at room temperature.

The total quantity of copolymerized ethylene in fraction B is preferably from 15% to 35% by weight.

The diene optionally present in fraction B(iii) and B(iv) is a conjugated or non-conjugated diene, such as butadiene, 1,4-hexadiene, 1,5-hexadiene and ethylidene-norbornene-1. The diene, when present, is contained in an amount of from 0.5 to 10% by weight, with respect to the weight of the fraction (B).

The heterophasic propylene polymers suitable as component (1) for the thermoplastic compositions of the invention are preferably prepared by sequential polymerization in at least two stages, with each subsequent polymerization stage being conducted in the presence of the polymeric material formed in the immediately preceding polymerization reaction, wherein the crystalline polymer fraction (A) is prepared in at least one first stage, and the elastomeric or ethylene copolymer fraction (B) is prepared in at least one second stage. The polymerization stages may be carried out in presence of a Ziegler-Natta and/or a metallocene catalyst. Preferably, all the polymerization stages are carried out in presence of a Ziegler-Natta catalyst comprising a trialkylaluminum compound, optionally an electron donor, and a solid catalyst component comprising a halide or a halogen-alcoholate of Ti and an electron-donor compound supported on anhydrous magnesium chloride.

The polymerization can be carried out in liquid phase, in gas phase or in liquid-gas phase, in continuous or batch reactors, such as fluidized bed or slurry reactors. For example, it is possible to carry out the polymerization of the crystalline propylene polymer (A) in liquid phase, using liquid propylene as diluent, while the copolymerization stages to obtain the elastomeric or the ethylene copolymer fraction (B) are carried out in gas phase, without intermediate stages except for the partial degassing of the monomers. Alternatively, all the sequential polymerization stages can be carried out in gas phase. The polymerization temperature for the preparation of fractions (A) and (B) can be the same or different and is usually from 40° C. to 90° C. The polymerization pressure preferably ranges from 5 to 30 bar if the polymerization is done in gas phase. Examples of heterophasic propylene polymers (1) are described in the European Patent EP 472 946, in the International patent application WO 03/011962 and WO 00/02929.

Component (2) of the thermoplastic polyolefin of the invention is an in-chain copolymer of ethylene with a comonomer selected from the group consisting of $C_{3-6}$ α,β-unsaturated mono- or poly-carboxylic acids, $C_{1-8}$ alkyl esters of a $C_{3-6}$ α,β-unsaturated mono- or poly-carboxylic acid and mixtures thereof.

The $C_{3-6}$ α,β-unsaturated carboxylic acid comonomer is preferably selected from acrylic acid, methacrylic acid, ethacrylic acid, itaconic acid, crotonic acid, maleic acid and its anhydride, citraconic acid and its anhydride, fumaric acid, aconitic acid, methyl hydrogenmaleate, methyl hydrogenfumarate. Acrylic and methacrylic acid are particularly preferred. The $C_{1-8}$ alkyl ester of the $C_{3-6}$ α,β-unsaturated mono- or poly-carboxylic acid is preferably an ester of the above mentioned carboxylic acids with a linear or branched alkyl group having from 1 to 8 carbon atoms; particularly preferred are esters selected from the group consisting of isopropyl acrylate, isopropyl methacrylate, t-butyl acrylate, t-butyl methacrylate and n-butyl acrylate, butyl-acrylates being particularly preferred. Preferably, the ethylene copolymer comprises from 1 to 10 mole of comonomer per 100 moles of ethylene. In a preferred embodiment, component (2) is a terpolymer comprising from 1 to 6 moles of $C_{1-8}$ alkyl ester of a $C_{3-6}$ α,β-unsaturated mono- or poly-carboxylic acid and from 1 to 4 moles of a $C_{3-6}$ α,β-unsaturated mono- or poly-carboxylic acid per 100 moles of ethylene. Particularly preferred is a terpolymer comprising from 1 to 6 moles of t-butyl acrylate and from 1 to 4 moles of acrylic acid per 100 moles of ethylene.

Suitable ethylene copolymers may be prepared by radical copolymerization of ethylene in presence of a proper amount of α,β-unsaturated carboxylic acid comonomer using a single stage high pressure polymerization process, wherein the total pressure is from 150 to 5000 bar (15-500 MPa) and the polymerization temperature is normally from 50° C. to 450° C. The polymerization reaction may be carried out in a continuous tubular reactor, preferably in a two zone tubular reactor in presence of a solvent. Suitable initiators for the copolymerization of ethylene and the above mentioned α,β-unsaturated carboxylic acids and/or α,β-unsaturated carboxylic acid esters are peroxide or hydroperoxide radical chain initiators. Examples of ethylene copolymers (2) are described in European Patent EP 157 106.

Component (3) of the thermoplastic polyolefin of the invention is a metal compound selected from the group consisting of acetates, stearates, hydroxides and oxides of zinc, magnesium, calcium, sodium and mixture thereof; zinc oxide and zinc acetate being particularly preferred.

The metal compound may be added to the thermoplastic polyolefin composition of the invention in powder form or as concentrate. By concentrate is meant herein a composition comprising high amount of the metal compound finely dispersed in a polymeric matrix.

To improve the compatibility of the components, the thermoplastic polyolefin composition of the invention may further comprise an olefin polymer (backbone) modified by graft polymerization with one or more polar vinyl monomer as compatibilizer (4). As polyolefin backbones, homopolymers or copolymers of olefins of the formula $CH_2=CHR^6$ may be used, where $R^6$ is H, a $C_{1-10}$ alkyl or aryl radical. In particular, said homopolymers or copolymers are selected from: HDPE, LLDPE and LDPE; propylene homopolymers; polybutene-1; crystalline copolymers of propylene and at least one alpha-olefin, where the alpha-olefin is preferably 1-butene, 1-hexene, 1-octene or 4-methyl-1-pentene; elastomeric ethylene/alpha-olefin copolymers or ethylene/alpha-olefin/diene terpolymers, in which the alpha-olefin is preferably propylene, 1-butene, 1-hexene, 1-octene or 4-methyl-1-pentene and the diene is preferably butadiene or 1,4-hexadiene. Also heterophasic propylene polymers such as herein described as Component (1) are suitable as polyolefin backbones. Non-polymerizable polar vinyl monomers preferably used in the modification of the polyolefin backbones are unsaturated cyclic anhydrides, their aliphatic diesters and their diacids, maleic anhydride being particularly preferred. The polyolefin backbone can be modified by using various methods to insert functional units in the backbone chains. For example, one can prepare a master polymer by grafting at least one polar monomer onto a propylene polymer by using free radical initiators, such as organic peroxides, according to the method described in U.S. Pat. Nos. 4,350,797 or by treating a propylene polymer in the particulate form with the polar monomers and radical initiators as described in European patent 572028. In both cases the master polymer so obtained is then blended in the molten state with the polyolefin backbone. Preferably but not necessarily, the propylene polymer used in the preparation of said master polymer is the same as the polyolefin backbone. It is also possible to blend the polar monomers and radical initiators directly with the polymer backbone in the molten state. Such blending step in the molten state is carried out according to any of the known techniques, preferably operating in an inert atmosphere, such as under nitrogen, and with conventional equipment, such as internal mixers or single or twin-screw extruders, the blending temperature being preferably 180 C to 230 C. The modified polyolefin preferably comprises from 0.03 to 5 wt. %, of grafted polar vinyl monomers based on the total weight of the polyolefin plus the polar vinyl monomer. The content of compatibilizer (4), when present, in the thermoplastic polyolefin composition of the invention is from 1.0 to 10.0 wt. %, preferably 2.0-8.0 wt. %, even more preferably 4.0-6.0 wt. %.

In a particularly preferred embodiment, the thermoplastic polyolefin composition of the invention comprises 40-50 wt. % of the heterophasic propylene polymer (1), 35-45 wt. % of the ethylene copolymer (2), 7-12 wt. % of the metal compound (3) and 4.0-6.0 wt % of compatibilizer (4).

The thermoplastic polyolefin compositions of the present invention may also further comprise conventional additives, such as pigments, antioxidants, UV-stabilizers, extender oils, fillers such as talc, glass fibres and $CaCO_3$, or flame retardants. Metering the type and amount of the additives is within the knowledge of the skilled man and depends on the destination and shape of the articles to be manufactured with the thermoplastic composition of the invention.

It is a further object of the present invention a process for the preparation of a thermoplastic polyolefin comprising the melt blending of:

(1) 30-70 wt. %, preferably 35-60 wt. %, more preferably 40-50 wt. %, of an heterophasic propylene polymer;

(2) 20-60 wt. %, preferably 30-45 wt. %, more preferably 35-45 (wt. %, of a copolymer of ethylene with a comonomer selected from the group consisting of $C_{3-6}$ α,β-unsaturated carboxylic acids, $C_{1-8}$ alkyl esters of a $C_{3-6}$ α,β-unsaturated carboxylic acid and mixtures thereof; and (3) 2-20 wt. %, preferably 4-12 wt. %, more preferably 7-12 wt. %, of a metal compound selected from the group consisting of acetates, stearates, hydroxides and oxides of zinc, magnesium, calcium, sodium and mixture thereof; and optionally (4) 1.0-10 wt. % of a compatibilizer.

The thermoplastic polyolefin is melt blended under high shear conditions, for example in a single-screw or in a twin-screw extruder. The heterophasic propylene polymer (1), the ethylene copolymer (2), the metal compound (3), optionally the compatibilizer (4) and the additives, if present, may be pre-mixed in a conventional mixer (ex. a tumble-mixer) to obtain a dry blend to be fed to the extruder. Alternatively, they may be metered simultaneously or separately directly to the extruder, into the same or different sections of the equipment. The extruding temperature generally ranges from 170 to 250° C.

In particular, the polymer blends obtainable by melt blending the thermoplastic polyolefin compositions of the invention have a Melt Flow Rate (MFR) of from 0.01 to 5.0 g/10 min., preferably of from 0.05 to 2.0 g/10 min., even more preferably the MFR is less than 1.0 g/10 min. The MFR is measured according to ISO 1133, condition 190° C./5.0 Kg. In a particularly preferred embodiment also the $MFR^1$ measured according to ISO 1133, condition 230° C./2.16 Kg of the polymer blend obtained by melt blending the thermoplastic polyolefin composition of the invention is from 0.01 to 5.0 g/10 min., preferably also the MFR¹ (230° C., 2.16 Kg) is less than 1.0 g/10 min.

The obtained polymer blend may be formed into sheets or may be molded into any the desired shape. In particular, the extruded blend may be firstly embossed to produce a grained surface and subsequently shaped to obtain the final article by positive thermoforming.

The thermoplastic polyolefin compositions thus obtained show high grain retention of the embossed pattern after the thermoforming and are additionally endowed with high scratch resistance. Moreover, they show a good balance of elastic properties and stiffness.

Additionally, the thermoplastic polyolefin compositions of the invention are endowed with good thermal stability as evidenced by their good resistance at elevated temperatures.

Being not bound to any theory, it is believed that the peculiar characteristics of the thermoplastic polyolefin composition of the invention are due to the selection of the proper heterophasic propylene polymer having the composition described hereinbefore in combination with the very narrow range of metal compound content.

The grain retention is herein defined as the difference in the depth of the embossed pattern before and after thermoforming.

The thermoplastic polyolefin composition of the invention is particularly suitable for producing thermoformed articles having at least one embossed surface, such as synthetic skins to be used in interior panels in automotive field.

The following examples are given to illustrate and not to limit the invention.

EXAMPLES

Grain retention. The depth of the embossed pattern (depth of waviness) was measured with a Hommel Tester T1000E (Hommel Werke GmbH) according to DIN 4774. The embossed sheets were formed by positive thermoforming using a VMF 65 thermoformer (IC Thermoforming System) having a plug with triangular profile, one wall of the plug being perpendicular to the sheet (back) and the second wall forming an angle of 45° with the sheet (front). The thermoformer was operated under the following conditions:

| Heating time (sec.) | Cooling time (sec.) | Cycle time (sec.) | External zone temp. (° C.) | Intermediate zone temp. (° C.) | Internal zone temp. (° C.) |
| --- | --- | --- | --- | --- | --- |
| 70 | 35 | 150 | 320 | 260 | 210 |

The difference in the depth of the embossed pattern before and after thermoforming was used to evaluate the grain retention of the specimens.

Scratch resistance. The scratch resistance of the thermoformed article was measured on embossed injection-moulded plaques according to Ford Laboratory Test Method BN-108-13. The specimen, a 205×146×4 mm plaque with different embossing areas, was injection-moulded using an injection press SANDRETTO 190 Series 7 (Industrie Sandretto) operating at the following moulding conditions:

| Screw speed (rpm) | Melt temp. (° C.) | Zone 1 temp. (° C.) | Zone 2 temp. (° C.) | Injection time (sec.) | Cooling time (sec.) |
| --- | --- | --- | --- | --- | --- |
| 120 | 250 | 240 | 245 | 6.0 | 30 |

The scratching apparatus included several weighted pins that rest on the surface of the test specimen. The pins used for the scratch test were 1.0 mm high polished steel pins that were loaded with different weights exerting the following standard forces on the specimen surface: 7.0 N, 6.0 N, 3.0 N, 2.0 N and 0.6 N. The pins were pulled along the test sample and each single scratch line was visually examined and rated in accordance with the following rating scale:

| Rating | Appearance |
| --- | --- |
| 1 | No evidence of wear |
| 2 | Very slight evidence of wear |
| 3 | Slightly visible evidence of wear |
| 4 | Visible evidence of wear |
| 5 | Evidence of excessive wear |

The scratch intensity is a general evaluation of the overall impression of the scratched surface based on the above-mentioned rating scale.

Black pigmented test specimens were used because experience indicates that scratching was easier to see with the naked eye on a black surface than on surfaces of other colours.

MFR and MFR¹ were measured according to ISO 1133, condition 190° C./5.0 Kg for MFR and condition 230° C./2.16 Kg for MFR¹.

Tensile stress at break was measured according to ISO R 527.

Elongation at break was measured according to ISO R 527.

Sagging test. Specimens: 1.5 cm×15 cm, thickness 1.0 mm thick; a hole having a diameter of 1.0÷1.5 mm is made at a distance of 1.0 cm from the edge of one of the short sides of the specimen. Procedure: the specimens are testes over a temperature range from 120° C. to 200° C. The specimens are placed in a oven (Heraeus STW65) at 120° C. and hold with a metallic support. The temperature is raised up to 200° C., keeping the temperature constant for 10 min at 140°, 160°, 180° and 200° C.; the specimens are visually observed and the behaviour recorded. The specimens are considered to fail the test when collapsing or when the hole deformation equals the half of the specimens' length (about 7.5 cm).

Examples 1 and 2 and Comparative Examples 3 and 4

The thermoplastic polyolefin having the compositions of Table 1 were melt blended in a twin screw extruder Maris TM45V (Officine Meccaniche F.lli Maris SpA). The different components were metered separately into the first section of the equipment except for the ZnO which was metered into the second section of the extruder. The extruder was operated under the following conditions:

| Screw speed (rpm) | Zone 1 temp. (° C.) | Zone 2 temp. (° C.) | Zone 3-9 temp. (° C.) | Zone 10 temp. (° C.) |
|---|---|---|---|---|
| 260 | 60 | 170 | 180 | 200 |

The thermoplastic polyolefin was extruded at a rate of 50-60 Kg/h, with a melt temperature of 240-245° C. The melt strands were quenched in water and palletised.

The polymer blend from the extruding step was subsequently formed into flat sheets using a second extruder COLINES LINEA/FOLGIO LASTRA 1200 (Colines Srl) equipped with a 80 mm screw and a L/D ratio of 30. The extruder was operated under the following conditions:

| Screw speed (rpm) | Line speed (m/min) | Zone cylinder 1 temp. (° C.) | Zone 2a temp. (° C.) | Head temp. (° C.) | Superior and inferior roll temp. (° C.) | Central roll temp. (° C.) |
|---|---|---|---|---|---|---|
| 70 | 1.7 | 205 | 170 | 215-225 | 60 | 70 |

The flat sheets were embossed with a Colombo M109 type embosser, having an embosser roll (diameter=200 mm) heated by diathermic oil. The machine was operated under the following conditions:

Line speed: 1.7 m/min

Cylinder pressure: 6 bar

Oil temperature: 75° C.

Pre-heating IR lamp temp.: 120° C.

Test results are reported on Table 2 and Table 3.

TABLE 1

| Component | Wt. % | | |
|---|---|---|---|
| | Example 1 | Example 2 | Comp. Example 3 |
| (1) heterophasic propylene polymer | 49.8 | 44.8 | 54.8 |
| (2) ethylene terpolymer | 39.0 | 39.0 | 44.0 |
| (3) metal compound | 8.0 | 8.0 | / |
| (4) compatibilizer | / | 5.0 | / |
| Stabiliser | 0.2 | 0.2 | 0.2 |
| Carbon black | 1.0 | 1.0 | 1.0 |

(1) Heterophasic propylene polymer comprises 33 wt. % of crystalline random propylene/ethylene copolymer comprising 3.2 wt. % of ethylene units, 6 wt. % of a crystalline essentially linear ethylene/propylene copolymer totally insoluble in xylene at room temperature and 61 wt. % of elastomeric fraction of an ethylene/propylene copolymer containing 27 wt. % of ethylene units and having a solubility in xylene of 65 wt. % at room temperature, intrinsic viscosity [η] of the xylene-soluble fraction of 3.2 dl/g, MFR (230° C./2.16 Kg) = 0.6 g/10 min;
(2) Ethylene terpolymer: ethylene/acrylic acid/t-butyl acrylate terpolymer containing 4 wt. % (1.7% by mole) of acrylic acid and 7 wt. % (1.7% by mole) of t-butyl acrylate, MFR (190° C./2.16 Kg) = 7.0 g/10 min;
(3) Metal compound: ZnO concentrate at 80 wt. % of ZnO supplied by Rhenogran. The percentage in Table 1 is referred to the net ZnO weight;
(4) Compatibilizer: heterophasic copolymer containing 0.7 wt. % grafted maleic anhydride; Stabiliser: Irganox B225 supplied by Ciba Specialty Chemicals.

TABLE 2

| | | Example 1 | Example 2 | Comp. Example 3 |
|---|---|---|---|---|
| MFR (190° C./5.0 Kg) | g/10 min. | 0.67 | 0.94 | 5.00 |
| MFR[1] (230° C./2.16 Kg) | g/10 min. | 0.38 | 0.47 | 3.00 |
| Tensile stress at break | % | 21.2 | 16.3 | 17.5 |
| Elongation at break | % | 473 | 262 | 709 |
| Scratch Number (7.0, 6.0, 3.0, 2.0, 0.6 N) | — | 11111 | 11111 | 33331 |
| Scratch intensity | — | 1 | 1 | 3 |

TABLE 3

| Pattern depth | Example 1 | | Example 2 | | Comp. Example 3 | |
|---|---|---|---|---|---|---|
| | back | front | back | front | back | front |
| Before thermoforming | 31.7 | 31.7 | 25.5 | 25.5 | 63.6 | 63.6 |
| After thermoforming | 19.7 | 10.3 | 12.1 | 20.8 | 21.2 | 22.2 |
| Grain retention | 12.0 | 21.4 | 13.4 | 4.7 | 42.4 | 41.4 |

The thermal stability of the thermoplastic polyolefin compositions of Examples 1 and 2 and of Comparative Examples 3 and 4 were evaluated with the sagging test. The results of the test are collected in Table 4. In Comparative Example 4 a multilayer compact sheet traded by Beneke-Kaliko under the name of TEPEO® was used.

TABLE 4

| | | Example 1 | Example 2 | Comp. Example 3 | Comp. Example 4 |
|---|---|---|---|---|---|
| test failure | ° C. | 180 | 200 | 172 | no fail |
| Comments | | Collapse after 2 min | collapses after 5 min | collapse | no evidence of deformation after 10 min at 200° C. |

The invention claimed is:

1. A thermoplastic polyolefin composition comprising:
   (1) 30-70 wt. % of a heterophasic propylene polymer; the heterophasic propylene polymer comprising:
      (A) 10-50 wt. % of a crystalline polymer fraction selected from the group consisting of:
         (i) a propylene homopolymer; and
         (ii) a copolymer of propylene and at least one alpha-olefin of formula $CH_2=CHR^3$, wherein $R^3$ is H or a $C_{2-8}$ linear or branched alkyl, said copolymer comprising at least 85 wt. % of propylene units; and
      (B) 50-90 wt. % of an ethylene copolymer comprising:
         (iii) 0-20 wt. % of a crystalline fraction of a copolymer of ethylene with at least one alpha-olefin of formula $CH_2=CHR^4$, wherein $R^4$ is a $C_{1-8}$ alkyl radical, optionally comprising a minor amount of a diene; and
         (iv) 80-100 wt. % of an elastomeric fraction of a copolymer of ethylene with at least one alpha-olefin of formula $CH_2=CHR^5$, wherein $R^5$ is a $C_{1-8}$ alkyl radical, optionally comprising a minor amount of a diene, and comprising less than 40 wt. % of ethylene units;
   (2) 20-60 wt. % of a copolymer of ethylene with a comonomer selected from the group consisting of $C_{3-6}$ alpha, beta-unsaturated carboxylic acids, $C_{1-8}$ alkyl esters of a $C_{3-6}$ alpha,beta-unsaturated carboxylic acid, and mixtures thereof; and (3) 2-20 wt. % of a metal compound selected from the group consisting of acetates, stearates, hydroxides, and oxides of zinc, magnesium, calcium, sodium, and mixtures thereof.

2. The thermoplastic polyolefin composition according to claim 1, wherein the copolymer of ethylene (2) comprises from 1 to 10 mole of comonomers per 100 moles of ethylene.

3. The thermoplastic polyolefin composition according to claim 1, wherein the copolymer of ethylene (2) comprises from 1 to 6 moles of t-butyl acrylate, and from 1 to 4 moles of acrylic acid per 100 moles of ethylene.

4. The thermoplastic polyolefin composition according to claim 1, wherein the metal compound is zinc oxide.

5. The thermoplastic polyolefin composition according to claim 1 further comprising 1.0-10.0 wt. % of an olefin polymer modified by graft polymerization with at least one polar vinyl monomer.

6. A process for preparing a thermoplastic polyolefin comprising melt blending:

(1) 30-70 wt. % of an heterophasic propylene polymer; the heterophasic propylene polymer comprising:

(A) 10-50 wt. % of a crystalline polymer fraction selected from the group consisting of:

(i) a propylene homopolymer; and (ii) a copolymer of propylene and at least one alpha-olefin of formula $CH_2=CHR^3$, wherein $R^3$ is H or a $C_{2-8}$ linear or branched alkyl, said copolymer comprising at least 85 wt. % of propylene units; and (B) 50-90 wt. % of an ethylene copolymer comprising:

(iii) 0-20 wt. % of a crystalline fraction of a copolymer of ethylene with at least one alpha-olefin of formula $CH_2=CHR^4$, wherein $R^4$ is a $C_{1-8}$ alkyl radical, optionally comprising a minor amount of a diene; and (iv) 80-100 wt. % of an elastomeric fraction of a copolymer of ethylene with at least one alpha-olefin of formula $CH_2=CHR^5$, wherein $R^5$ is a $C_{1-8}$ alkyl radical, optionally comprising a minor amount of a diene, and comprising less than 40 wt. % of ethylene units;

(2) 20-60 wt. % of a copolymer of ethylene with a comonomer selected from the group consisting of $C_{3-6}$ alpha, beta-unsaturated carboxylic acids, $C_{1-8}$ alkyl esters of a $C_{3-6}$ alpha,beta-unsaturated carboxylic acid, and mixtures thereof;

(3) 2-20 wt. % of a metal compound selected from the group consisting of acetates, stearates, hydroxides, and oxides of zinc, magnesium, calcium, sodium, and mixtures thereof; and (4) optionally, 1.0-10.0 wt. % of a compatibilizer.

7. An article comprising the thermoplastic polyolefin composition according to claim 1.

8. A thermoformed article comprising the thermoplastic polyolefin obtained by the process according to claim 6.

9. A synthetic skin comprising the thermoplastic polyolefin obtained by the process according to claim 6.

10. A thermoplastic polyolefin obtained by the process according to claim 6, wherein the thermoplastic polyolefin further comprises a MFR value (ISO 1133, 190° C./5.0 Kg) ranging from 0.01 to 5.0 g/10 mm.

11. The thermoplastic polyolefin according to claim 10, wherein the thermoplastic polyolefin further comprises a $MFR^1$ value (ISO 1133, 230° C./2.16 Kg) ranging from 0.01 to 5.0 g/10 mm.

12. The thermoplastic polyolefin composition according to claim 1, wherein the thermoplastic polyolefin composition comprises 4-12 wt. % of the metal compound.

13. The thermoplastic polyolefin composition according to claim 1, wherein the thermoplastic polyolefin composition comprises 7-12 wt. % of the metal compound.

14. A thermoplastic polyolefin composition consisting essentially of:

(1) 30-70 wt. % of a heterophasic propylene polymer;

(2) 20-60 wt. % of a copolymer of ethylene with a comonomer selected from the group consisting of $C_{3-6}$ alpha, beta-unsaturated carboxylic acids, $C_{1-8}$ alkyl esters of a $C_{3-6}$ alpha,beta-unsaturated carboxylic acid, and mixtures thereof; and (3) 2-20 wt. % of a metal compound selected from the group consisting of acetates, stearates, hydroxides, and oxides of zinc, magnesium, calcium, sodium, and mixtures thereof.

* * * * *